United States Patent
Ehrke (10) Patent No.: US 7,490,867 B2
(45) Date of Patent: Feb. 17, 2009

(54) PIPE CONNECTOR AND A METHOD FOR PRODUCTION THEREOF

(75) Inventor: Dieter Ehrke, Bielefeld (DE)

(73) Assignee: Parker Hannifin PLC, Bielefeld (DE)

( * ) Notice: Subject to any disclaimer, the term of this patent is extended or adjusted under 35 U.S.C. 154(b) by 0 days.

(21) Appl. No.: 10/109,796

(22) Filed: Mar. 28, 2002

(65) Prior Publication Data
US 2002/0101079 A1 Aug. 1, 2002

Related U.S. Application Data

(63) Continuation of application No. PCT/DE00/04304, filed on Nov. 29, 2000.

(30) Foreign Application Priority Data
Nov. 30, 1999 (DE) .................. 199 58 475

(51) Int. Cl.
*F16L 17/00* (2006.01)
(52) U.S. Cl. ................... 285/354; 285/382.7
(58) Field of Classification Search ........ 285/247, 285/389, 387, 386, 382.7, 234, 334.5, 354, 285/382, 233, 343, 348
See application file for complete search history.

(56) References Cited

U.S. PATENT DOCUMENTS

| | | | | |
|---|---|---|---|---|
| 2,171,217 A | * | 8/1939 | Kreidel | 285/341 |
| 3,007,721 A | * | 11/1961 | Schmohl et al. | 285/342 |
| 3,092,404 A | * | 6/1963 | MacWilliam | 285/334.4 |
| 3,287,034 A | * | 11/1966 | Bragg | 285/382 |
| 4,022,499 A | * | 5/1977 | Holmes et al. | 285/382.7 |
| 4,688,312 A | | 8/1987 | Sasao et al. | |
| 5,893,591 A | | 4/1999 | Ebel et al. | |
| 6,168,211 B1 | | 1/2001 | Schorn-Gibson | |
| 6,431,613 B1 | * | 8/2002 | Altenrath et al. | 285/354 |

FOREIGN PATENT DOCUMENTS

| | | |
|---|---|---|
| DE | 195 20 099 A1 | 1/1997 |
| DE | 195 41 622 A1 | 2/1997 |
| DE | 197 42 917 C1 | 6/1999 |
| DE | 195 11 063 C2 | 1/2000 |
| FR | 624097 | 7/1927 |
| GB | 2329685 A * | 3/1999 |
| WO | WO 01/40693 | 6/2001 |

OTHER PUBLICATIONS

The International Search Report in corresponding PCT Application No. PCT/DE00/04304.

* cited by examiner

*Primary Examiner*—Aaron M Dunwoody
(74) *Attorney, Agent, or Firm*—Christopher H. Hunter (57) ABSTRACT

The invention relates to a pipe connector for a pressure-resistant, positive-fit, high pressure screwed joint. The connection includes a formed tube; a screw body or connector branch with a cone, which connects to a parallel axis drilling, with a radial end surface; a union nut; a sealing ring; and a retaining ring. The formed tube has a parallel axis end-piece with the same tube diameter and which corresponds to the depth of the tube seat base. The formed tube has a pronounced head which forms a mating face, with a cone surface of the union nut, and which leads to an abutment face at a front face of the retaining ring, essentially aligned with the tube axis. The retaining ring has a radial ring surface, which, in the assembled state, contacts with the front face of the cone of the connector branch or screw body, and thus permits a block assembly.

32 Claims, 5 Drawing Sheets

PIPE CONNECTOR AND A METHOD FOR PRODUCTION THEREOF

CROSS REFERENCE TO RELATED APPLICATIONS

This application is a continuation of copending International Application No. PCT/DE00/04304, filed Nov. 29, 2000, which designated the United States, the disclosure of which is incorporated herein by reference, and claims priority to German Patent Application 19958475.3, filed Nov. 30, 1999.

BACKGROUND OF THE INVENTION

The invention relates to a tube connector for a pressure, tearout-resistant and positive high-pressure screw union. The screw union includes a deformed tube, a union member or connecting piece with a cone which is followed by an axially parallel bore with a radial end face, a union nut, a sealing ring and a retaining ring. The deformed tube has an end piece of the same tube diameter which is roughly axially parallel according to the depth of the tube seat bottom.

The invention, furthermore, relates to a process for making a complex tube deformation with the aid of a modified upsetting procedure, as well as tools for the implementation of the process.

Tube connections by means of tube deformation are known in a wide variety of embodiments, the realization of such deformations being effected mainly by means of upsetting operations, and the forming operation being limited for reasons of deformation-engineering and material. In particular, complex tube deformations cannot be realized with the known upsetting procedures.

A tube connector in which the tube to be formed is bulged out by inserting a metal ring as an abutment piece is known from the European Patent Application 0 380 970 A2. A clamping device with pressure areas cooperating with the abutment areas of the abutment piece is provided on the outer face of the tube. Such a tube connector is particularly suitable for plastic tubes and flexible hoses. It cannot, however, control high and maximum pressures.

A union for a flat-cone pressure line in which the connecting end is formed from the tube material is known from DD 240 059. A connecting shoulder pressed on according to the contours of a standardized cutting ring and a conical portion running out forwardly is formed in the region of the union of a pressure-line tube. Its cone angle is smaller than the cone angle of the conical opening of a standardized threaded connecting piece. In a large area of the union there are different inner tube diameters which also create different inner tube resistances for the flow medium. This known system does not offer receiving space for a seal.

DE 19511063 A1 describes a tube connector having a union member with cone and a union nut, with the tube deformation adapting itself largely, but not exactly, to the shape of the cone as well as the union nut. In one embodiment, the free space forming between the inclined surface of the union nut and the front face of the union member is filled up with a sealant. In a further embodiment, a sealing member is arranged between the conical surface of the union member and the deformed tube. When using a standardized union nut, a larger area of the conical surface remains unused. Likewise, the radial face of the connecting piece is not used or only insufficiently used in special cases so that transfer of the assembly forces onto the tube to be connected essentially takes place via inclined surfaces, resulting in the exclusive use of components of the forces applied. Moreover, completion of the assembling operation is conveyed indistinctly to the fitter so that overtightening seems to be possible.

DE 19520099 describes a tube connector for a pressure-tight and positive connection with a deformed tube, a union member with a cone which is followed by an axially parallel bore with a radial end face and a union nut, the deformed tube having an end piece of the same tube diameter which is axially parallel according to the depth of the tube seat bottom. In the assembled condition, a radially extending locating ring face of the deformed tube comes to rest against the front face of the tube connecting piece.

A further union with a supporting ring can be gathered from DE 19742917 C1 which relates to easily deformable and thin-walled tubes. The area of the deformed tube covered by the cone of the union nut is extremely small, while the larger part is covered by the supporting ring. It is true that this permits assembly on a block, but there is no certainty regarding the tearout resistance of the tube in high-pressure applications.

DE 195 41 622 A1 describes a high-pressure connection system with a cutting-ring connection and a connection with a deformed tube. The parts of the tube deformation form a maximum angle of 45° or less with the elements of the tube union so that only corresponding components of the applied assembly forces are transferred onto the tube. Assembly on a block is not possible so that completion of the assembling operation cannot be conveyed distinctly to the fitter and overtightening can take place very easily. In addition, the radial force components applied during assembly cause a constriction of the deformed tube region and its immediate vicinity. A constriction reduces the pretension of the upstream seal and, thus, the sealing behavior of the connection system. In addition, the constriction causes a reduction of the overlapping faces between tube deformation and union nut and, thus, a reduction of the tearout resistance.

SUMMARY OF THE PRESENT INVENTION

The object of the present invention is a high-pressure union, its realization and the tools required for its realization. The union is designed as a positive system with a high degree of safety, and is useful as a tube connector for metallic tubes for high and maximum pressures and, thus, also for tubes with greater wall thicknesses consisting of a minimum number of parts as possible and whose assembly can be carried out safely without risk of overtightening or reduction of the sealing function, the aim being to prevent settlement of the union in operation.

According to the invention, the tube is deformed with a distinct torus, forming a locating surface with the conical surface of the union nut which transitions into a stop face directed radially towards the tube axis for a front face of the retaining ring.

As a consequence, the acting assembly forces are vertically on top of each other, thereby increasing the sealing forces.

In an improvement of the invention, the inner contour of the retaining ring facing the tube jacket and starting from the stop face of the tube torus is formed directly onto the tube and is, thus, positively connected with the tube jacket so that a large locating surface is available.

In one embodiment of the invention, the union nut is standardized and forms a locating surface with the torus of the deformed tube with an inclination of 45° in relation to the axis of the tube.

The conical bore of the union nut extends up to its threaded bore, and the retaining ring, in its assembled condition, forms an annular gap to the cone of the union nut with its ring surface which is running in parallel to the cone of the union nut.

The annular gap between union nut and retaining ring, preferably, continues beyond a partial area of its cylindrical outer surface.

In an advantageous improvement, the retaining ring is provided with a plastic or elastomer coating over part of its cylindrical outer surface which is formed as a substrate for nipples which, in the assembled condition, are lying in the area of the female thread of the nut. The nipples mesh with the end region of the union nut, thereby ensuring that the retaining ring holds the union nut together undetachably on the end of the tube during transport of these parts to the assembly site until final assembly can commence by insertion of the connecting piece.

According to the invention, a sealing chamber in which a sealing ring formed as an elastomer seal with pressure-supporting sealing effect is arranged, is formed in the assembled condition of the tube connector between the cone of the connecting piece or union member, the axially parallel end piece and a ring surface of the retaining ring.

In an advantageous embodiment, the elastomer sealing ring is firmly connected with the retaining ring and is, preferably, prevulcanized or bonded.

In a further embodiment of the invention, the front face of the axially parallel end piece of the deformed tube forms a contact face with the tube seat bottom of the connecting piece in the assembled condition of the connection.

According to a practical example, this front face of the tube end piece is, advantageously, shot burnished so that a perfect metallic sealing surface is formed.

In a further embodiment this task is completed by other measures. On this occasion, the front face of the axially parallel end piece of the deformed tube features a closed torus which occupies a fraction of the front face which, preferably, joins up with the inner tube wall and forms a metallic seal with the tube seat bottom of the connecting piece in the assembled condition of the connection.

With regard to the excellent effect of the tube connector it is of importance that the supporting ring has a higher strength than the tube piece, the connecting piece and the nut. The supporting ring is preferably made by heat treatment.

In an advantageous embodiment, the retaining ring has a radially extending ring surface which, in the assembled condition, makes contact with the front face of the cone of the connecting piece or of the union member, thereby advantageously effecting a block assembly so that overtightening is precluded.

The tube connector according to the invention permits the use of standardized components such as the union nut. The union nut includes a locating surface with an inclination of 45° in relation to the axis of the tube being formed with the torus of the deformed tube.

In a further embodiment of the invention, a supporting sleeve which is clamped with the tube by the union nut in the assembled condition joins up directly with the tube deformation as a protection against mechanical vibrations which can progress via the tube system and, thus, also via the tube connector.

The invention also relates to the process for making a deformed tube for a tube connector of the type described above, well as to the tools used for this purpose. A defined deformation is made at the end of that tube by means of a tube forming device in which the tube is clamped in jaws and in which a substantial part of the tube end to be worked on remains unclamped, and the tube end is formed with the aid of a hydraulically and/or electro-mechanically operable accessory of the tube forming device. According to the invention, a deformation force is periodically exerted onto the outer and/or inner tube circumference at the same time and in addition to the axial upsetting force of the tube end to be formed, and the tool transferring the force describes virtual rotational conical surfaces as a function of the deformation to be realized.

The jaws in the deformation area of the tube have inner negative deformation contours into which the tube is pressed by the axial forces and/or radial components of the deformation forces which are acting onto the tube end. Means for increasing the frictional resistance of the tube jacket are provided in the tube holding area so that the gripping resistance of the tube in the clamping device is increased.

In a modified embodiment of the tools according to the invention, the jaws can be designed for receiving releasable forming jaws having inner negative deformation contours in the tube forming area into which parts of the tube wall are pressed by the axial forces and/or radial components of the deformation forces which are acting onto the tube end. In this embodiment there are also provided means for increasing the frictional resistance in the tube holding area so that the gripping resistance of the tube in the clamping device is increased. This embodiment offers the advantage that, in case of a modification of the tubes to be worked on, for example if their diameters have to be changed or if the type of their deformations merely requires changing of the forming jaws, the jaws can be used universally, resulting in considerable tooling cost savings.

According to the invention, the tool head of the tube forming tool is designed cup-shaped with an inner diameter which is larger than the diameter of the tube to be worked on, with the area of the inner cup edge being provided with forming toruses extending around the inner circumference for deformation of the tube end.

In an improvement of the invention, the cup bottom is provided with a formed-out portion against which the front face of the tube end strikes for the purpose of being worked on.

The tube forming tool is detachably connected with a force transfer shaft which describes virtual rotational conical surfaces at an acute angle in relation to the tube axis during its movement for deformation of the tube end, so that the transfer of force onto the tube end to be worked on takes place periodically.

In an improvement of the invention, the inside of the cup is designed for receiving a forming tool which is provided with a swivel mounted forming mandrel with a forming torus at its front end. This forming mandrel is swivel mounted in a conical bore of an insertable member which is detachably arranged in the inside of the cup, the conical bore being provided with recesses in its wall for accommodating the tube deformations effected by the forming mandrel from the interior of the tube. This causes the jacket of the tube end to be worked on periodically from inside and outside at the same time, with the forming process taking place cyclically by the rotary motion of the forming tool in a very careful manner so as to protect the tube end. Stress and stress relief as well as heating and cooling follow each other so that the inner structure of the formed tube is not subjected to any critical stresses, thereby improving its structure considerably. The fact that the area of the effect of force on the material of the tube to be formed has been reduced, except for one line, compared with the previous procedures, causes the specific short—term effect of force to be considerably greater. This enables the forces originating from the forming tools to be reduced so that wear of the tools is lower and the tools can be designed in a more compact manner.

At the base of the forming mandrel, the distance to the jacket of the bore of the insertable member corresponds to one tube jacket thickness of the tube to be worked on. From this base, the axial forces are periodically transferred directly onto the tube end, while the forming mandrel periodically applies radial forces onto the inner tube wall at the same time.

In an alternative embodiment of the invention, a deformation cup arranged above the unclamped end of the clamped tube has recesses in the area of its upper inner edge, and this is acted upon on its outer cup bottom by a cylinder whose working surface is designed as a flat cone which is rolling off on the cup bottom around its center in radial linear contact, with the axis of the flat cone revolving on a virtual rotational conical surface and periodically transferring a radial and axial force component onto the deformation cup and, thus, onto the tube end to be formed.

DETAILED DESCRIPTION OF THE PREFERRED EMBODIMENT

Figure 1:
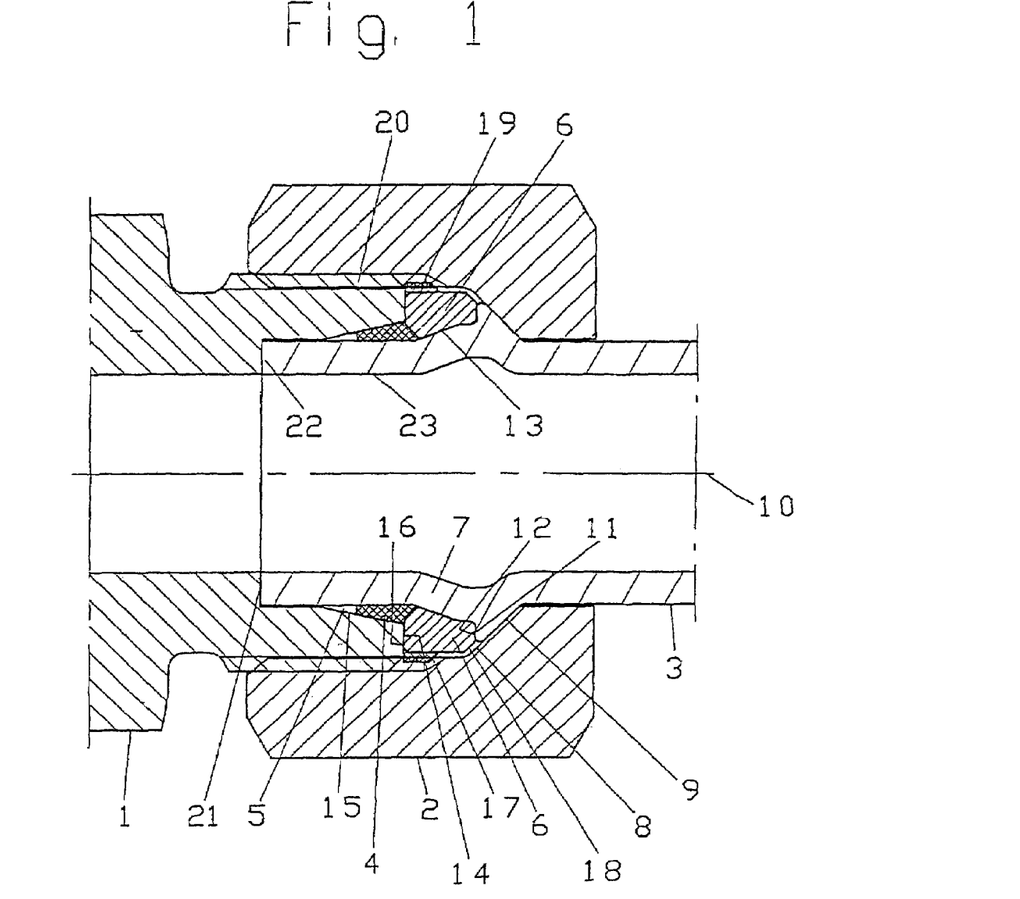
FIG. 1 shows a longitudinal section through an assembled tube connector of a practical example of the invention.

The connection system shown in FIG. 1 consists of a union member (or connecting piece) 1 with a conical opening 15 which, in a practical example, is designed as a standardized 24° cone; a standardized union nut 2; a deformed tube 3; and a sealing ring 4. The sealing ring 4 is, preferably made of elastomer, i.e., a polymer with gumelastic properties, with a profile adapted to a sealing chamber 5. The sealing chamber 5 is defined by part of the tube 3, a supporting or retaining ring 6 and the conical opening 15 of the connecting piece 1. The tube torus 7 is provided with a specific formed—out portion whose realization will be described later. The distinct tube torus 7 forms a locating surface 9 with the conical surface 8 of the union nut 2 which transitions into a stop face 11 directed essentially towards the tube axis 10 for locating a front face 12 of the retaining ring.

The locating surface 11 of the tube torus 7 to the tube axis 10 preferably forms a right angle since such an angle is particularly advantageous for the transfer of the applied forces. Within the framework of manufacturing accuracy, slight deviations from the right angle can also occur without abandoning the scope of protection of the invention.

The retaining ring 6 has an inner contour 13 facing the tube torus and starting from the stop face 11 of the tube torus 7 and/or the front face 12 of the retaining ring 6 and preferably extend between and interconnecting the stop face 11 and the front face 12.

According to the invention, the retaining ring 6 is, furthermore, provided with an radially extending rear ring surface 14 which, in the assembled condition, makes contact with the front face 16 of the cone 15 of connecting piece 1, thus permitting a block assembly.

The union nut 2 can be in accordance with a German Industrial Standard (DIN) and can form a locating surface 9 with an inclination of 45° relative to the axis 10 of the tube 3 with the torus of the deformed tube.

The conical surface 8 of the union nut 2 extends up to the threaded bore of the union nut; and an annular gap 18 is provided between the retaining ring 6 and the conical surface 8 of the union nut 2, in the assembled condition, with a front ring surface which extends in parallel with the conical surface 8 of the union nut.

The annular gap 18 between union nut 2 and retaining ring 6 extends up to a partial area of the cylindrical outer surface of the retaining ring.

In an advantageous embodiment, the retaining ring 6 is provided with a plastic or elastomer coating 19 over part of its cylindrical outer surface which is designed as a substrate for nipples which, in the assembled condition, are lying in the area of the female thread 20 of the nut 2. With this nipple coating, the retaining ring 6 adheres to the nut 2 during the assembling operation so that both component parts hold one another and cannot move away from the tube torus 7.

In a special practical example, the elastomer sealing ring 4 is firmly connected with the retaining ring, for instance bonded, to further facilitate assembly.

In a further practical example, the front face 22 of the axially parallel end portion 23 of the deformed tube 3 forms a contact face with the tube seat bottom 21 of the connecting piece 1 in the assembled condition of the connection.

According to a practical example of the invention, the front face 22 of the tube end piece 23 or a radial portion thereof is shot burnished so that, in special cases, a metallic seal with the tube seat bottom 21 can be achieved.

The tube connector according to the invention is improved still further by the supporting ring 6 having a higher strength than i) the tube piece 23 including the tube torus 7, ii) the connecting piece 1, and iii) the nut 2. The proposed higher strength of the supporting ring 6 is, preferably, achieved by heat treatment of the ring.

In a further practical example of the invention, a supporting sleeve {not shown in detail in the drawing} is provided which joins up directly with the tube deformation and is clamped with the tube 3 by the union nut 2. This makes it possible to considerably damp any vibrations which are entering into the tube system so that the vibrations do not have any detrimental effect in the tube union.

Figure 2:
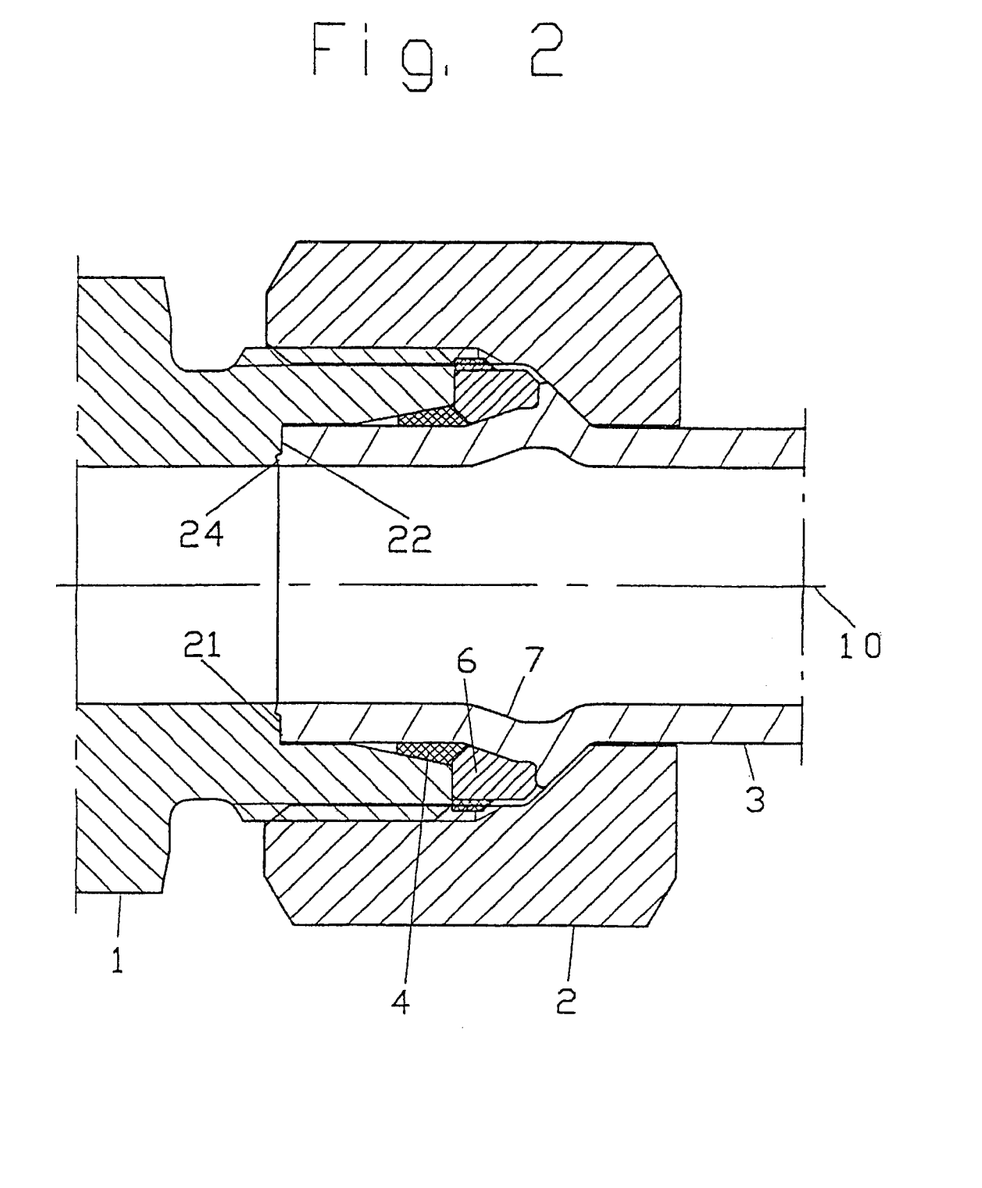
FIG. 2 shows a longitudinal section through an assembled tube connector of a further practical example according to the invention with a torus on the front face of the tube end.

FIG. 2 shows the same illustration of a tube connector as FIG. 1, however, in a modified embodiment. The front face 22 of the axially parallel end piece 23 of the deformed tube 3 features a closed torus 24 which occupies a fraction of the front face 22 and forms a metallic seal with the tube seat bottom 21 of the connecting piece 1 in the assembled condition of the tube connection. The torus 24 is squeezed during assembly so that a metallic seal exists.

FIGS. 3 to 11 show various tools for the realization of a tube deformation for a tube connector, e.g. for a tube connector of the previously described embodiments. The tools described below are suitable for realizing complex tube deformations even of different tube sizes. According to the invention, the previously known axial upsetting procedure is combined with a forming procedure according to a tumbling or rotational principle where, in addition to the axial upsetting force exerted onto the tube end to be formed, a forming force is being exerted onto the outer and/or inner tube circumference with a radial force component. During the rotary motion, the tool transferring the force describes a virtual conical surface as a function of the deformation to be realized. As a consequence, the effect of the force takes place point-focally or linearly onto the tube portion to be formed, with these sites of the effect of force rotating on the outer and/or inner tube circumference around the circumference of the tube. Surprisingly, this operating and forming method offers a number of advantages which take effect on both the material to be formed and on the working tools.

A mechanical stress, closely concentrated locally and exerted onto the material, is followed directly by a prolonged stress relief phase—according to the speed of rotation of the working tool—and equally a local heating caused by the locally applied mechanical stress is followed by a prolonged cooling-down phase according to the rotation period of the tool. Therefore, a critical loading of the material is avoided and, as a consequence, a gentle forming takes place which also has an extremely favorable effect on the microstructure of the material.

The forming tool exerts a higher specific loading on the tool with equal energy consumption because of the reduced force transfer area. This enables the energy consumption to be reduced with a resultant reduction of the loading of the tool and an extension of its useful life.

Figure 11:
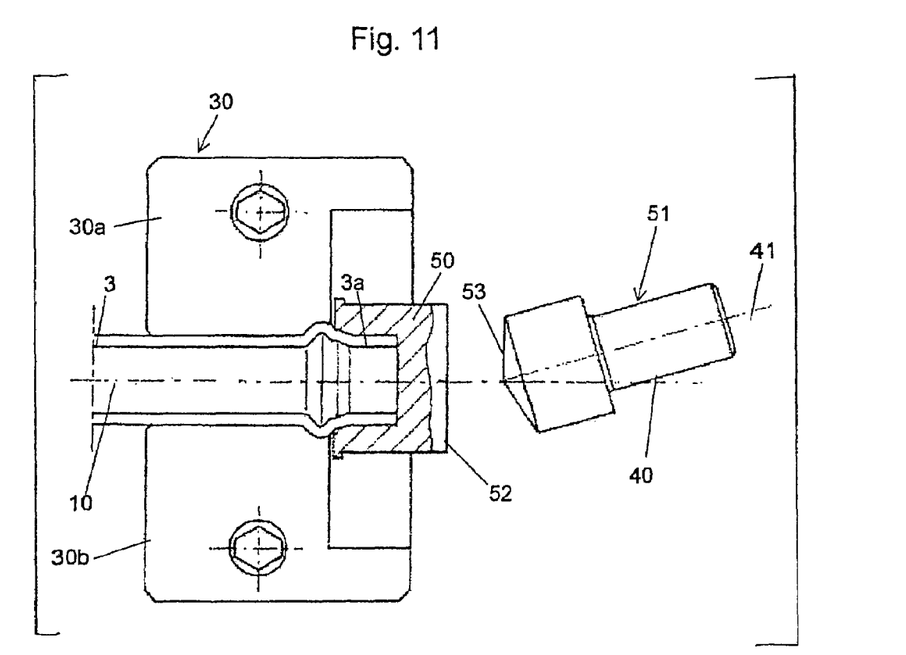
FIG. 11 shows yet another embodiment of a forming tool according to the invention.

A type of tool as described above is illustrated in FIGS. 3 to 6 in its different stages of operation; whereas FIGS. 7 to 10 show a further type of tool of this description in its different stages of operation. Yet another type of tool is shown in FIG. 11 in one stage of operation.

All of the tools illustrated hereinafter have certain basic principles in common. For instance, a defined deformation is realized at the end of tube 3 by means of a tube forming device having jaws 30 with jaw parts 30a and 30b for clamping a tube 3 to be formed. To do so, the tube 3 is clamped in position by the jaws 30a and 30b in such a manner that a substantial part of the tube end 3a to be worked on remains unclamped and that the tube end 3a is axially upset with the aid of a hydraulically and/or electro-mechanically operable tube forming device.

Figure 5:
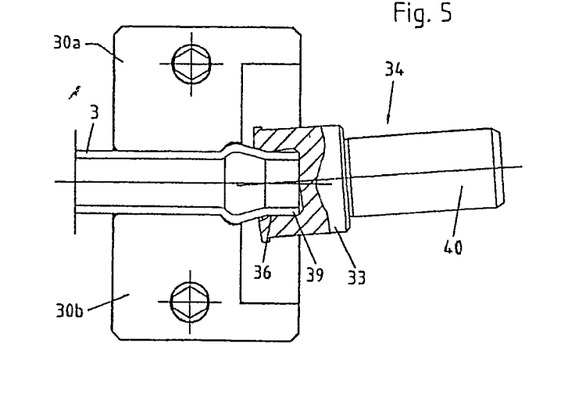
FIG. 5 shows a longitudinal section through the forming tool of FIG. 3 at a subsequent stage of operation.
Figure 6:
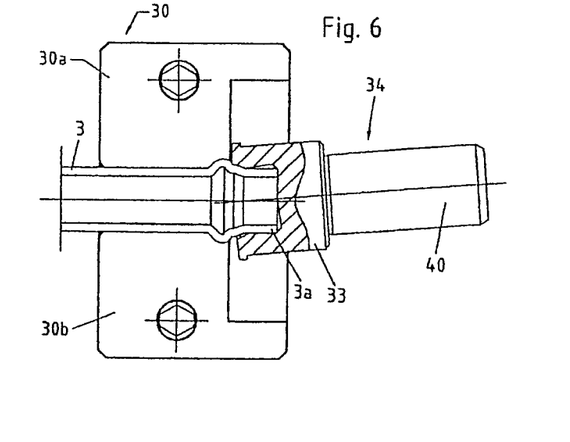
FIG. 6 shows a longitudinal section through the forming tool of FIG. 3 at a subsequent stage of operation.

The jaws 30a and 30b have a recess 31 in the tube forming portion into which the tube 3 extends with its unclamped part 3a. In the forming area 3a of the tube 3 there are inner negative deformation contours 32 into which parts of the tube wall are pressed by the axial forces and/or radial components of the forming forces which are acting upon the tube end, as shown in FIGS. 5 and 6.

Means for increasing the frictional resistance of the tube jacket and, thus, the gripping resistance are provided in the tube holding area of the jaws 30a and 30b. For instance, these consist of granules pressed into the jaws or milled-in grooves.

The tool head 33 of the tube forming tool 34 is designed cup-shaped (cup 35) with an inner diameter which is larger than the diameter of the tube to be worked on, with the area of the inner cup edge being provided with forming toruses 36 extending around the inner circumference or recesses 37 for the deformation of the tube end 3a.

The cup bottom 38 is provided with a formed-out portion against which the front face 22 of the tube end 39 strikes periodically for its forming and for the transfer of axial forces.

The tube forming tool 34 is detachably connected with a force transfer shaft 40 which describes virtual rotational conical surfaces at an acute angle in relation to the tube axis (angle between the axis 41 of the force transfer shaft 40 and the tube axis 10) during its movement for deformation of the tube end 3a.

In a further modification of this embodiment, the jaws 30a and 30b are designed for releasably receiving forming jaws 30c (FIG. 3) which are releasably inserted into the jaws 30a, 30b and clamped in position. In the process, the inner negative deformation contours 32 are located in the tube forming area of the forming jaws whereas, on the other hand, the jaws are designed neutrally. Therefore, the jaws can be used universally, whereas the more moderately-priced forming jaws are designed differently depending on the forming program, as the case may be. Just as in the above described embodiment, the tube holding area of the forming jaws is provided with means which increase the frictional resistance between tube jacket and forming jaws and, thus, the gripping resistance.

Figure 3:
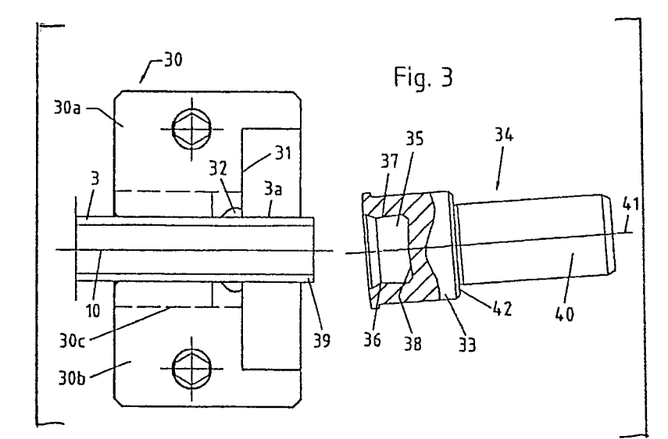
FIG. 3 shows a longitudinal section through a forming tool at a first stage of operation.

FIG. 3 shows the preliminary stage where a tube forming tool 34 is fed to a tube 3 clamped in position between the forming jaws 30a and 30b.

Figure 4:
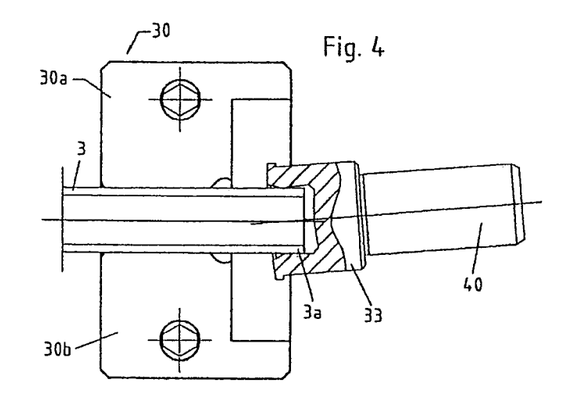
FIG. 4 shows a longitudinal section through the forming tool of FIG. 3 at a subsequent stage of operation.

FIG. 4 shows the insertion stage of the tube end 3a into the cup 35 at an acute angle.

FIG. 5 shows a stage of operation at which axial forces were already exerted onto the tube end 3a so that the tube jacket, compulsorily, places itself into the offered deformation contours. Other degrees of deformation freedom for the tube jacket are blocked by the tool head so that, compulsorily, it has to occupy a specified deformation. Since the tube forming tool 34 takes up an acute angle and rotates about this angle during the forming operation, the transfer of force takes place point-focally or linearly onto the tube end 3a, with the contact and/or force transfer surfaces rotating around the tube jacket and around the front face of the tube.

FIG. 6 shows the further continuation of the deformation process where an axial force is—in relation to the tube—periodically transferred from the cup bottom 38 onto the tube end 3a. At the same time, the deformation torus 36 of the cup 35—related to the tube end 3a—likewise exerts a radial force onto the outside of the tube jacket until the final stage according to FIG. 6 is reached and the desired deformation of the tube is completed.

FIGS. 7 to 10 show a modification of the tool according to the invention where, for deformation of the tube end 3a, a third force component is likewise periodically transferred to said tube end 3a. This force is exerted onto the inner jacket of the tube to be formed.

For this purpose, the inside of the cup 48 is designed for receiving a forming tool which is provided with a forming mandrel 43 with a forming torus 44 at its front end.

The forming mandrel 43 is swivel mounted about the axis 47 in a conical bore 45 of an insertable member 46 arranged in the inside of the cup so that forces can be transferred onto the inner tube wall of the tube 3 at any depth of immersion of the forming mandrel 43, with the conical bore 45 being provided with recesses in its wall for accommodating the tube deformations effected by the forming mandrel 43 from the interior of the tube.

At the base of the forming mandrel 43, the distance to the jacket of the bore 45 of the insertable member 46 corresponds to one tube jacket thickness of the tube to be worked on 3, with the base periodically transferring axial forces onto the tube end 3a to be formed, and the forming mandrel 43 periodically transferring radial forces onto the inside of the jacket of the tube end 3 a at the same time.

Figure 7:
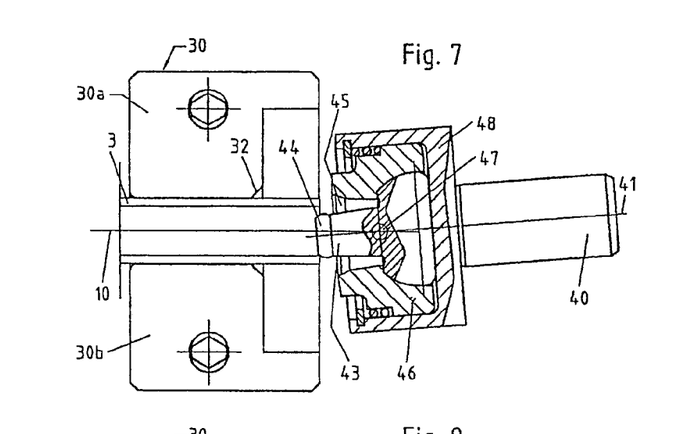
FIG. 7 shows a longitudinal section through a further embodiment of the forming tool at a first angle of operation.

FIG. 7 shows the preliminary forming stage at which the force transfer shaft 40 with its cup 48 is fed to the unclamped end of the tube 3 to be worked on, at an acute angle. The acute angle results from the angle between the tube axis 10 and the axis 41 of the force transfer shaft 40.

Figure 8:
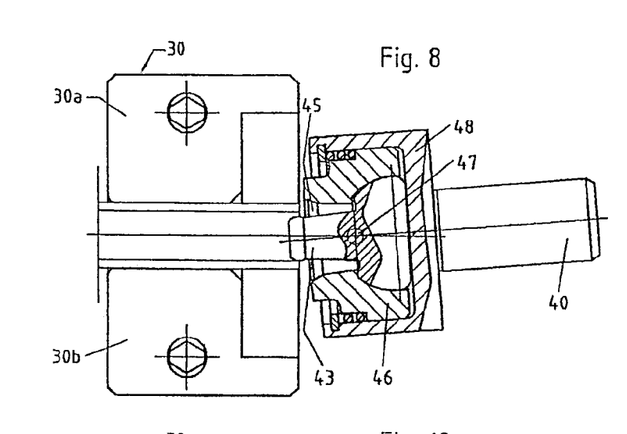
FIG. 8 shows a longitudinal section through the forming tool of FIG. 7 at a subsequent stage of operation.
Figure 9:
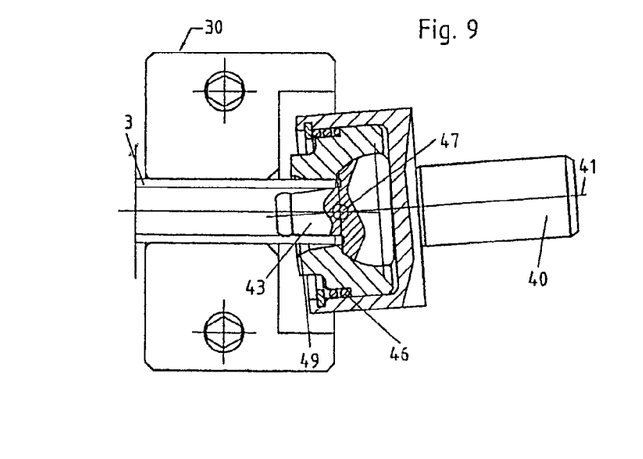
FIG. 9 shows a longitudinal section through the forming tool of FIG. 7 at a subsequent stage of operation.
Figure 10:
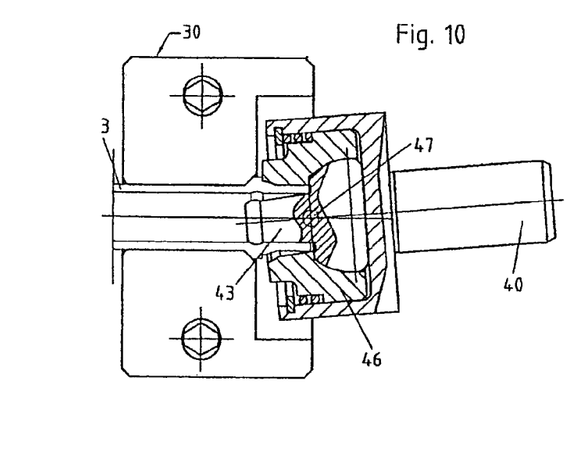
FIG. 10 shows a longitudinal section through the forming tool of FIG. 7 at a subsequent stage of operation.

FIG. 8 shows the further feeding of the tool with its cup 48 until the forming mandrel 43 has been moved completely into the interior of the tube, as shown in FIG. 9. Upon reaching the end of the conical bore 45 through the tube end, the transfer of the axial force onto the tube can start. Since the axis 41 rotates around the imaginary extension of the tube axis 10, thereby describing a virtual acute angle, the force transfer line migrates periodically on the front face of the tube end 3a and periodically exerts an axial force onto the tube. Equally, the tangent of the forming torus 44 of the forming mandrel 43 migrates on an inner circular path on the inner tube jacket exerting a radial force with the same period onto the inner tube jacket. Since the inner jacket of the conical bore 45 has recesses 49 into which the tube deformation adapts itself, a radial force acting on the outer tube jacket rakes place in a period having its time shifted by 180°. This becomes particularly obvious from the working stages shown in FIGS. 9 and 10.

This enables the realization of complex tube deformations with careful treatment of the tube material, thereby considerably improving the microstructure and extending the useful life of the tools since they are loaded to a much lesser extent than in the known forming procedures.

FIG. 11 shows a further tool for the realization of a tube deformation which operates on similar principles as the tool described in FIGS. 3 to 6.

The deformation cup 50 is acted upon on its outside of the cup bottom 52 by a force transfer cylinder 51 whose working surface is designed as a flat cone 53 which is rolling off on the outside of the cup bottom 52 around its center (point of intersection of the tube axis 10) in radial linear contact, with the axis 41 of the flat cone 53 revolving on a virtual rotational conical surface, thereby periodically transferring a radial and axial force component onto the deformation cup 50 and, thus, onto the tube end 3a to be formed.

Consequently, the force transferred by the power transmission cylinder 51 via the flat cone 53 onto the outside of the cup bottom 52 is acting in a radial line emanating from the center of the cup bottom surface which revolves around the center. Therefore, the forces acting on the tube end migrate periodically as an axial force onto the front face of the tube and as a radial force onto the outer jacket of the tube.

Consequently, the aforementioned advantages of a careful material deformation and, thus, an improvement of the microstructure as well as an extension of the useful life of the tools are provided by the present invention.

What is claimed is:

1. A tube connector for a pressure, tearout-resistant and positively-locking high-pressure screw union, the tube connector comprising:
a deformed tube; a union member with a conical opening at a front face and an axially parallel bore with a radial end face defining a tube seat bottom; a union nut; a sealing ring; and a retaining ring; the deformed tube having an end portion of the same tube diameter at the union member bore which is axially parallel to the union member bore to the depth of the tube seat bottom, wherein the tube is deformed with a distinct torus, the torus forming an inclined locating surface which in an assembled condition is located against a conical surface of the union nut, and which transitions into a stop face directed radially towards a geometric axis of the tube at a right angle to the geometric axis, and in the assembled condition, directly against a radially extending front face of the retaining ring, which front face extends also at a right angle to the geometric axis, and wherein the retaining ring is provided with a radially extending rear ring surface which, in the assembled condition, makes contact with the front face of the union member, which also extends radially, and wherein the conical surface of the union nut extends up to a threaded bore, and the retaining ring, in the assembled condition, has a front conical ring surface that forms an annular gap with respect to the conical surface of the union nut, with the front ring surface of the retaining ring extending in parallel with the conical surface of the union nut, and wherein in the assembled condition, forces applied by the union nut through the mating surfaces of the union nut and the tube torus are applied primarily axially through the retaining ring to the union member.

2. A tube connector as in claim 1, wherein the retaining ring has an inner non-linear contour facing the tube and staffing from the stop face of the tube torus, the inner contour of the retaining ring being in flush, surface-to-surface contact with an outer non-linear contour of the tube.

3. A tube connector as in claim 1, wherein the conical surface of the union nut defines a locating surface with an inclination of 45° in relation to a geometric axis of the tube.

4. A tube connector as in claim 1, wherein the annular gap between the union nut and the retaining ring extends to a partial area of a cylindrical outer surface of the retaining ring.

5. A tube connector as in claim 1, wherein a sealing chamber, in which the sealing ring formed as an elastomer seal with pressure-supporting sealing effect is arranged, is defined in an assembled condition of the tube connector between the conical opening of the union member, the end portion of the tube, and a ring surface of the retaining ring.

6. A tube connector as in claim 5, wherein the elastomer sealing ring is firmly connected with the retaining ring.

7. A tube connector as in claim 1, wherein a front face of the end piece of the deformed tube forms a contact face with the tube seat bottom of the connecting piece in the assembled condition of the connector.

8. A tube connector as in claim 7, wherein the front face of the end piece of the deformed tube further includes a closed torus which occupies only a fraction of the front face and forms a metallic seal with the tube seat bottom of the union member in the assembled condition of the connection.

9. A tube connector as in claim 1, wherein the stop face forms essentially a right angle with an adjacent rear portion of the torus.

10. A tube connector as in claim 1, wherein the retaining ring has a higher strength than the tube end portion, the union member, and the union nut.

11. A tube connector as in claim 10, wherein the higher strength of the retaining ring is achieved by heat treatment.

12. A tube connector as in claim 1, wherein the front face of the retaining ring has the same outer radial dimension as the stop face of the torus.

13. A tube connector for a pressure, tearout-resistant and positive high-pressure screw union, the tube connector comprising:
a deformed tube; a union member with a conical opening at a front face and an axially parallel bore with a radial end face defining a tube seat bottom; a union nut; a sealing ring; and a retaining ring; the deformed tube having an end portion of the same tube diameter at the union member bore which is axially parallel to the union member bore to the depth of the tube seat bottom, wherein the tube is deformed with a distinct torus, the torus forming an inclined locating surface against a conical surface of the union nut and which transitions into a stop face directed radially towards a geometric axis of the tube at a right angle to the geometric axis, and against a front face of the retaining ring, wherein the retaining ring is provided with a plastic or elastomer coating over part of its cylindrical outer surface which is formed as a substrate for nipples which, in an assembled condition of the connector, are located in a threaded area of the union nut.

14. A tube connector, comprising:

a tube circumscribing a central geometric axis, and having a radially-outward projecting torus formed in a portion of the tube at a location spaced from one end of the tube;

a union member with a central bore extending axially through the union member, a conical opening into the bore at a front face of the union member, and a radial end face defining a tube seat bottom along the bore, the tube being received in the central bore of the union member and bottoming against the tube seat bottom;

a union nut threadably engaged with the union member and having an internal conical surface;

a sealing ring disposed between the conical surface of the union member and the tube; and a retaining ring with a radially-extending front face at a right angle to the geometric axis, wherein the torus on the tube defines: i) a front inclined locating surface in engagement with the conical surface of the union nut; and ii) a rear, radially-directed stop face at a right angle to the geometric axis, in direct engagement with the front face of the retaining ring, and wherein the retaining ring is provided with a radially extending rear ring surface in direct engagement with the front face of the union member, which also extends radially, and wherein the conical surface of the union nut extends to a threaded bore, and the retaining ring has a front conical ring surface that forms an annular gap with respect to the conical surface of the union nut when the connector is in an assembled condition, with the front ring surface of the retaining ring extending in parallel with the conical surface of the union nut, and wherein in the assembled condition, forces applied by the union nut through the mating surfaces of the union nut and the tube torus are applied primarily axially through the retaining ring to the union member.

15. The tube connector as in claim 14, wherein the retaining ring has an inner non-linear contour surface facing the tube, the inner contour of the retaining ring being in flush, surface-to-surface contact with an outer non-linear contour of the tube.

16. The tube connector as in claim 14, wherein the conical surface of the union nut defines a locating surface with an inclination of 45° with respect to a geometric axis of the tube.

17. The tube connector as in claim 14, wherein the annular gap also extends to an area outwardly surrounding a cylindrical outer surface of the retaining ring.

18. The tube connector as in claim 14, wherein the sealing ring is disposed in a sealing chamber defined between the conical opening of the union member, an outer surface of the tube and a rear ring surface of the retaining ring, and provides a fluid-tight seal between the union member and the tube.

19. The tube connector as in claim 14, wherein the sealing ring is fixed to the retaining ring.

20. The tube connector as in claim 14, wherein the one end of the tube has a contact face in sealing engagement with the tube seat bottom of the union member.

21. The tube connector as in claim 20, wherein the contact face of the tube end further includes a closed torus across only a portion of the front face which forms a metallic seal with the tube seat bottom of the union member.

22. A tube connector as in claim 14, wherein the stop face forms essentially a right angle with an adjacent rear portion of the torus.

23. A tube connector as in claim 14, wherein the retaining ring has a higher strength than the tube portion, the union member, and the union nut.

24. A tube connector as in claim 14, wherein the front face of the retaining ring has the same outer radial dimension as the stop face of the torus.

25. A tube connector, comprising:

a tube circumscribing a central geometric axis, and having a radially-outward projecting torus formed in a portion of the tube at a location spaced from one end of the tube;

a union member with a central bore extending axially through the union member, a conical opening into the bore at a front face of the union member, and a radial end face defining a tube seat bottom along the bore, the tube being received in the central bore of the union member and bottoming against the tube seat bottom;

a union nut threadably engaged with the union member and having an internal conical surface;

a sealing ring disposed between the conical surface of the union member and the tube; and a retaining ring with a radially extending front face at a right angle to the geometric axis, wherein the torus on the tube defines: i) a front locating surface in engagement with the conical surface of the union nut; and ii) a rear, radially-directed stop face at a right angle to the geometric axis, in engagement with the front face of the union member, which also extends radially, wherein the retaining ring includes a plastic or elastomer coating on a cylindrical outer surface, located in a threaded area of the union nut, the coating retaining the retaining ring in the union nut during assembly.

26. A tube connector as in claim 25, wherein the front face of the retaining ring has the same outer radial dimension as the stop face of the torus.

27. A tube connector for a pressure, tearout-resistant and positively locking high-pressure screw union, the tube connector comprising:

a deformed tube; a union member with a conical opening at a front face and an axially parallel bore with a radial end face defining a tube seat bottom; a union nut; a sealing ring; and a retaining ring; the deformed tube having an end portion of the same tube diameter at the union member bore which is axially parallel to the union member bore to the depth of the tube seat bottom, wherein the tube is deformed with a distinct torus, the torus forming an inclined locating surface located against a conical surface of the union nut and which transitions into a stop face directed radially towards a geometric axis of the tube at a right angle to the geometric axis, and directly against a front, radially-directed face of the retaining ring, which front face also extends at a right angle to the geometric axis, and wherein the retaining ring is provided with a radially extending rear ring surface in direct engagement with the front face of the union member, which also extends radially, and wherein the conical surface of the union nut extends to a threaded bore, and the retaining ring has a front conical ring surface that forms an annular gap with respect to the conical surface of the union nut when the connector is in an assembled condition, with the front ring surface of the retaining ring extending in parallel with the conical surface of the union nut, and wherein in the assembled condition, forces applied by the union nut through the mating surfaces of the union nut and the tube torus are applied primarily axially through the retaining ring to the union member.

28. A tube connector as in claim 27, wherein the retaining ring has a higher strength than the tube end portion, the union member, and the union nut.

29. A tube connector as in claim 27, wherein the front face of the retaining ring has the same outer radial dimension as the stop face of the torus.

30. A tube connector, comprising:

a tube having a radially-outward projecting torus formed in a portion of the tube at a location spaced from one end of the tube;

a union member with a central bore extending axially through the union member, a conical opening into the bore at a front face of the union member, and a radial end face defining a tube seat bottom along the bore, the tube being received in the central bore of the union member and bottoming against the tube seat bottom;

a union nut threadably engaged with the union member and having an internal conical surface;

a sealing ring disposed between the conical surface of the union member and the tube; and a retaining ring with a front, radially-directed face at a right angle to a geometric axis of the tube, wherein the torus on the tube defines: i) a front inclined locating surface in engagement with the conical surface of the union nut; and ii) a rear, radially-directed stop face also at a right angle to the geometric axis of the tube, in direct engagement with the front face of the retaining ring, and wherein the retaining ring is provided with a radially extending rear ring surface in direct engagement with the front face of the union member, which also extends radially, and wherein the conical surface of the union nut extends to a threaded bore, and the retaining ring has a front conical ring surface that forms an annular gap with respect to the conical surface of the union nut when the connector is in an assembled condition, with the front ring surface of the retaining ring extending in parallel with the conical surface of the union nut, and wherein the assembled condition, forces applied by the union nut through the mating surfaces of the union nut and the tube torus are applied primarily axially through the retaining ring to the union member.

31. A tube connector as in claim 30, wherein the retaining ring has a higher strength than the tube portion, the union member, and the union nut.

32. A tube connector as in claim 30, wherein the front face of the retaining ring has the same outer radial dimension as the stop face of the torus.

* * * * *